J. G. MURPHY.
Slate-Washers.

No. 144,280.           Patented Nov. 4, 1873.

WITNESSES.

INVENTOR
John G. Murphy
per
F. A. Lehmann, Atty

UNITED STATES PATENT OFFICE.

JOHN G. MURPHY, OF MATTEAWAN, NEW YORK.

IMPROVEMENT IN SLATE-WASHERS.

Specification forming part of Letters Patent No. 144,280, dated November 4, 1873; application filed June 3, 1873.

*To all whom it may concern:*

Be it known that I, JOHN G. MURPHY, of Matteawan, in the county of Dutchess and State of New York, have invented certain new and useful Improvements in Slate-Washers; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in slate-washers; and it consists in a block or piece of felt compressed to a suitable degree of hardness, so that it will be firm and retain water an indefinite length of time, as will be more fully described hereafter.

Figure 1:
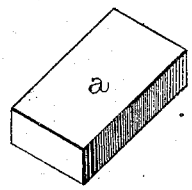
Figure 2:
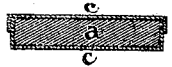

Figure 1 is a perspective of one of my washers. Fig. 2 is a sectional view of a washer inclosed in a case or box.

I take a piece of felt, $a$, of suitable thickness, and, after having compressed it so as to make it hard and firm, cut out the washers of any desired shape or size. These will readily absorb water, and, being dense and thick, will retain it an indefinite length of time, giving it out only in small quantities when compressed. In order that it may be carried in the pocket and kept moist as long as possible, each block should be inclosed in a small tin box, $c$, coated on its inside with some non-corrosive substance, which will prevent the moisture from injuring the box.

Washers prepared in this manner are especially adapted for this purpose, being tough and almost indestructible, and will retain moisture longer than almost any other substance.

Having thus described my invention, what I claim as new, and desire to secure by Letters Patent, is—

As a new article of manufacture, a slate-washer consisting of a block of compressed felt, $a$, in combination with a suitable inclosing case or box, $c$, substantially as shown and described.

In testimony that I claim the foregoing I have hereunto set my hand this 22d day of May, 1873.

JOHN G. MURPHY.

Witnesses:
EMORY L. TOMPKINS,
JOHN F. PEROW.